(12) United States Patent
Yawata

(10) Patent No.: US 11,460,691 B2
(45) Date of Patent: Oct. 4, 2022

(54) MOTOR, MIRROR ROTARY DEVICE, AND DISK DRIVE DEVICE

(71) Applicant: Nidec Corporation, Kyoto (JP)

(72) Inventor: Atsushi Yawata, Kyoto (JP)

(73) Assignee: NIDEC CORPORATION, Kyoto (JP)

( * ) Notice: Subject to any disclaimer, the term of this patent is extended or adjusted under 35 U.S.C. 154(b) by 417 days.

(21) Appl. No.: 16/785,683

(22) Filed: Feb. 10, 2020

(65) Prior Publication Data

US 2020/0301131 A1 Sep. 24, 2020

(30) Foreign Application Priority Data

Mar. 18, 2019 (JP) .............................. JP2019-049263

(51) Int. Cl.
| | |
|---|---|
| *B41J 2/47* | (2006.01) |
| *G02B 26/12* | (2006.01) |
| *H02K 29/06* | (2006.01) |
| *H02K 7/08* | (2006.01) |
| *H02K 1/2706* | (2022.01) |
| *G02B 26/08* | (2006.01) |

(52) U.S. Cl.
CPC ......... *G02B 26/12* (2013.01); *G02B 26/0816* (2013.01); *H02K 1/2706* (2013.01); *H02K 7/08* (2013.01); *H02K 29/06* (2013.01)

(58) Field of Classification Search
CPC .... G02B 26/12; G02B 26/121; G02B 26/122; G02B 26/127; H02K 1/2706; H02K 7/08; H02K 29/06; G03G 15/0409; G03G 15/041
See application file for complete search history.

(56) References Cited

U.S. PATENT DOCUMENTS

| | | | |
|---|---|---|---|
| 9,515,533 B2 * | 12/2016 | Kodani | ................ H02K 11/215 |
| 2006/0139442 A1 | 6/2006 | Kurita | |
| 2016/0349659 A1 * | 12/2016 | Shoji | .................. G03G 15/0409 |

* cited by examiner

*Primary Examiner* — Hoang X Ngo
(74) *Attorney, Agent, or Firm* — Keating & Bennett

(57) ABSTRACT

A motor includes a stationary unit and a rotation unit. The rotation unit includes a rotor hub, an annular body, and a clamp. The rotor hub is mounted with a first magnet opposite to the stator. The annular body is supported on an outer circumferential portion of the rotor hub. The clamp is directly or indirectly fixed to the rotor hub farther radially inside than the annular body, and presses the annular body to an axially lower side. The rotor hub includes a flange that expands radially outside from at least a portion excluding an upper end portion. On a surface of the clamp, a pattern to be detected to detect rotation of the rotation unit positioned in a circumferential direction with the central axis as the center is provided. The annular body is sandwiched between the flange and the clamp in an axial direction.

16 Claims, 8 Drawing Sheets

MOTOR, MIRROR ROTARY DEVICE, AND DISK DRIVE DEVICE

CROSS REFERENCE TO RELATED APPLICATION

The present invention claims priority under 35 U.S.C. § 119 to Japanese Application No. 2019-049263 filed on Mar. 18, 2019 the entire contents of which are hereby incorporated herein by reference.

1. FIELD OF THE INVENTION

The present disclosure relates to a motor, a mirror rotary device, and a disk drive device.

2. BACKGROUND

A conventional mirror rotary device that rotates a polygon mirror having a plurality of mirror planes on an outer circumferential surface is used in a measuring device of distance between vehicles or a multifunctional device. The mirror rotary device is a device that scans reflected light by irradiating the mirror planes of the polygon mirror with a laser beam while rotating the polygon mirror.

A conventional laser mirror irradiation apparatus sometimes has a configuration in which a rotor case is fixed to an upper end portion of a rotation shaft via a hub base, and a polygon mirror is placed on the hub base and pressed and fixed by a pressing spring. An FG magnet is attached to a lower surface of a flange portion formed at a lower part of a peripheral wall of the rotor case. The FG magnet is opposite to an FG pattern formed on a substrate with a predetermined interval. As the rotor case rotates, an alternating-current (AC) voltage in proportion to motor speed is generated in the FG pattern. As a result, a synchronization signal for controlling emission of a laser beam in synchronization with the number of planes of the polygon mirror is detected.

A gap between the rotor case to which the rotation shaft, the hub base, and a motor drive magnet are fixed and the substrate is minute. Therefore, when the apparatus is assembled, the FG magnet and the FG pattern must be mounted and formed while being positioned with high precision in the minute gap, so that an operation is difficult and there is a risk that manufacturing efficiency is reduced. Moreover, there is a risk that the number of parts increases, and a manufacturing cost increases.

SUMMARY

An example embodiment of the present disclosure is a motor that includes a stationary unit including a stator and a rotation unit rotatably supported with respect to the stationary unit with a central axis vertically extending as a center via a bearing. The rotation unit includes a rotor hub that is at least partially positioned radial outside of the stator. The rotor hub is mounted with a first magnet being opposite to the stator, and expands in an annular shape around the central axis. The rotation unit also includes an annular body supported by an outer circumferential portion of the rotor hub, and a clamp that is directly or indirectly fixed to the rotor hub farther radially inside than the annular body and that presses the annular body to an axially lower side. The rotor hub includes a flange portion that expands radially outside from at least a portion excluding an upper end portion. The clamp is provided with a pattern to be detected to detect rotation of the rotation unit, and the pattern to be detected is positioned in a circumferential direction with the central axis as the center on a surface of the clamp. The annular body is sandwiched between the flange and the clamp in an axial direction.

The above and other elements, features, steps, characteristics and advantages of the present disclosure will become more apparent from the following detailed description of the example embodiments with reference to the attached drawings.

DETAILED DESCRIPTION

Hereinafter, example embodiments of the present disclosure will be described with reference to the drawings. In the present application, a direction parallel to a central axis of a motor is referred to as an "axial direction", a direction orthogonal to the central axis of the motor is referred to as a "radial direction", and a direction along an arc around the central axis of the motor is referred to as a "circumferential direction". In the present application, a shape and positional relationship of each part will be described assuming that the axial direction is a vertical direction and a clamp side with respect to an annular member is an upper side. It should be noted that directions of the motor, a mirror rotary device, and a disk drive device according to the present disclosure at a used time are not intended to be limited by a definition of the vertical direction described above. In the present application, "a parallel direction" includes a substantially parallel direction. In the present application, "an orthogonal direction" includes a substantially orthogonal direction.

Figure 1:
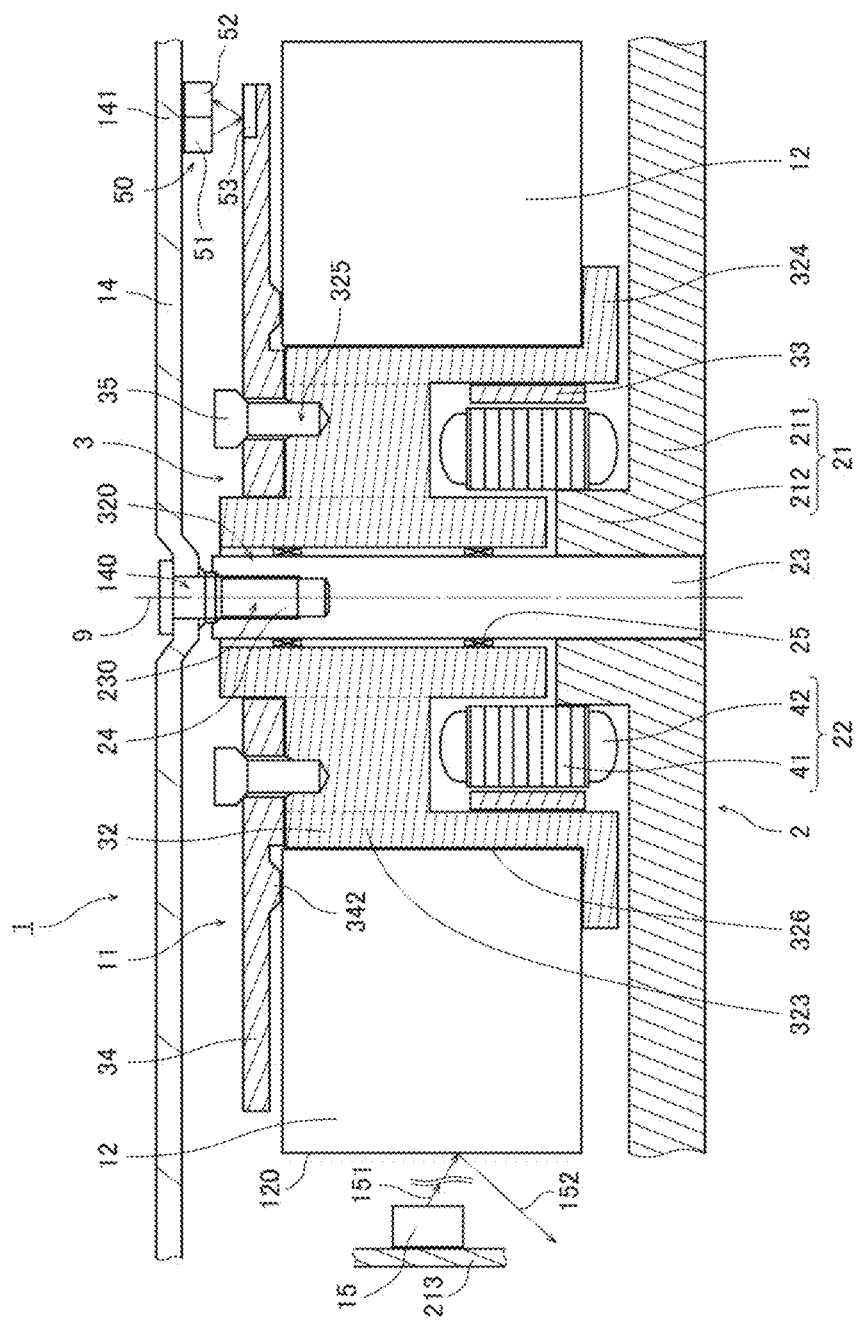
FIG. 1 is a vertical cross-sectional view of a mirror rotary device according to a first example embodiment of the present disclosure.

FIG. 1 is a vertical cross-sectional view of a mirror rotary device 1 according to a first example embodiment. The mirror rotary device 1 is a device that rotates a polygon mirror (mirror unit 12) having a polygonal outer circumferential surface such as a triangle or a quadrangle when viewed in the axial direction, and irradiates reflection surfaces 120 of the mirror unit 12 with a laser beam (incident light 151), so that its reflected light 152 is scanned. As shown in FIG. 1, the mirror rotary device 1 includes a motor 11, a cover 14, and a main light source 15.

The motor 11 rotates the mirror unit 12 with a central axis 9 extending vertically as a center while supporting the mirror unit 12. A part of a base portion 21 described later of the motor 11 expands in the radial direction in a lower side of the mirror unit 12. Another part of the base portion 21 (refer to a side wall portion 213 described later) extends in the axial direction in a radial outside of a rotation unit 3 and the mirror unit 12 of the motor 11. The cover 14 expands in the radial direction in an upper side of the motor 11. As a result, the rotation unit 3 and the mirror unit 12 of the motor 11 are accommodated in a housing constituted by the base portion 21 and the cover 14.

The mirror unit 12 is an annular member having a circular hole in a central portion. The mirror unit 12 is supported by the rotation unit 3 of the motor 11 in the circular hole. The mirror unit 12 is provided with a plurality of the reflection surfaces 120 on an outer circumferential portion, and each of the reflection surfaces 120 faces to the radial outside.

The main light source 15 is fixed to an inner circumferential surface of the side wall portion 213 described above in the radial outside of the mirror unit 12. The incident light 151 proceeding inward in the radial direction toward the reflection surface 120 of the mirror unit 12 is emitted from the main light source 15. The incident light 151 incident on the reflection surface 120 is changed in direction by the reflection surface 120 to become reflected light 152, and irradiated to an outside of the mirror rotary device 1 via an opening (not shown) adjacent to the side wall portion 213 in the circumferential direction.

Figure 2:
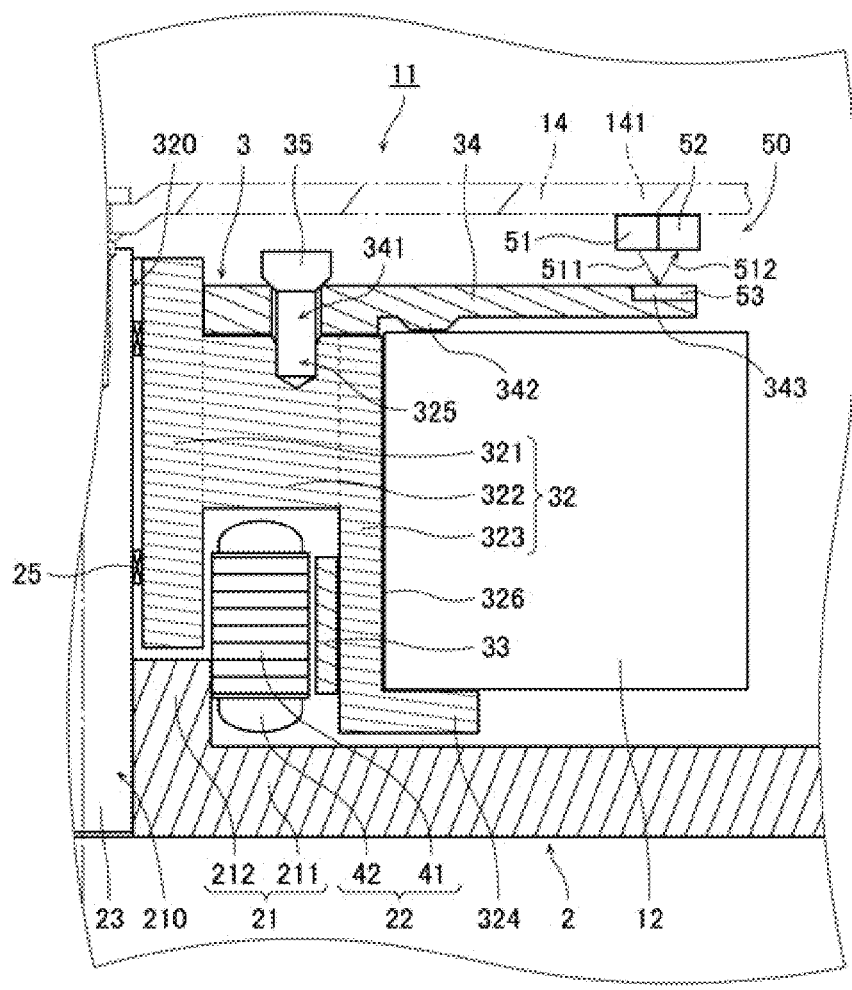
FIG. 2 is a partially vertical cross-sectional view of a motor according to the first example embodiment of the present disclosure.

A more detailed configuration of the motor 11 will be described hereinafter. FIG. 2 is a partially vertical cross-sectional view of the motor 11 according to the first example embodiment. As shown in FIG. 1 and FIG. 2, the motor 11 has a stationary unit 2, the rotation unit 3, and bearing portions 25. The stationary unit 2 is relatively stationary with respect to a housing of the mirror rotary device 1. The rotation unit 3 is rotatably supported with respect to the stationary unit 2 via bearing portions 25 with the central axis 9 as the center.

The stationary unit 2 of the present example embodiment includes the base portion 21, a stator 22, and a shaft 23.

The base portion 21 supports the stator 22. As material of the base portion 21, for example, metal such as an aluminum alloy or stainless steel is used. The base portion 21 includes a base bottom plate portion 211, a base cylindrical portion 212, and the side wall portion 213. The base bottom plate portion 211, the base cylindrical portion 212, and the side wall portion 213 are formed in one piece.

The base bottom plate portion 211 expands perpendicularly to the central axis 9 below the rotation unit 3 and the mirror unit 12. A circuit board (not shown) for supplying a drive current to the motor 11 is arranged on the base bottom plate portion 211 of the present example embodiment. The base cylindrical portion 212 extends upward in a substantially cylindrical shape from a radially inner end portion of the base bottom plate portion 211. The base cylindrical portion 212 is arranged substantially coaxially with the central axis 9. A lower portion of the shaft 23 described later is fixed to an inner circumferential surface of the base cylindrical portion 212. The side wall portion 213 extends in the axial direction in the radial outside of the rotation unit 3 and the mirror unit 12. The side wall portion 213 covers a part of an outer circumferential surface of the motor 11 including the mirror unit 12 in the circumferential direction. An upper end portion of the side wall portion 213 is fixed to a lower surface of the cover 14. The side wall portion 213 may not be fixed to the cover 14.

The stator 22 is an armature having a stator core 41 and a plurality of coils 42. The stator 22 is positioned above the base bottom plate portion 211 and in a radial outside of the base cylindrical portion 212. The stator core 41 is made of, for example, a laminated steel plate in which electromagnetic steel plates such as silicon steel plates are laminated in the axial direction. The stator core 41 is directly supported by the base portion 21 by being fixed to an outer circumferential surface of the base cylindrical portion 212 with, for example, an adhesive. The stator core 41 may be indirectly supported by the base portion 21 via another member.

The plurality of coils 42 is an aggregate of conductive wires wound around a plurality of teeth of the stator core 41. The drive current of the motor 11 is supplied to the coils 42 from an external power source (not shown) via the circuit board and the conductive wires. The plurality of teeth and the plurality of coils 42 are preferably arranged in an annular shape at substantially equal intervals in the circumferential direction around the central axis 9.

The shaft 23 is a member that is arranged along the central axis 9 and extends in the axial direction in a radial inside of the rotation unit 3. Metal such as stainless steel, for example, is used as material of the shaft 23. A screw hole 230 (refer to FIG. 1) is formed at an upper end portion of the shaft 23. The cover 14 described above has a through hole 140 penetrating in the axial direction. The cover 14 is fixed to the upper end portion of the shaft 23 by screwing a first fastening member 24 such as a screw passing through the through hole 140 into the screw hole 230. A part including a lower end portion of the shaft 23 is inserted into a through hole 210 penetrating the base bottom plate portion 211 in the axial direction, and is fixed to the base bottom plate portion 211.

The rotation unit 3 of the present example embodiment includes the mirror unit 12 described above, a rotor hub 32, a first magnet 33, and a clamp 34.

The rotor hub 32 is a member that expands in an annular shape around the central axis 9. The rotor hub 32 covers an axially upper side and a radial outside of the stator 22. That is, at least a part of the rotor hub 32 is positioned in the radial outside of the stator 22. As material of the rotor hub 32, for example, metal such as a stainless-steel based metal or an aluminum alloy is used. As shown in FIG. 2, the rotor hub 32 has an inner cylindrical portion 321, a disk portion 322, an outer cylindrical portion 323, and a flange portion 324. The inner cylindrical portion 321, the disk portion 322, the outer cylindrical portion 323, and the flange portion 324 are formed in one piece.

The inner cylindrical portion 321 is positioned at the most radial inside of the rotor hub 32 and extends in a cylindrical shape in the axial direction around the shaft 23. An upper end portion of the inner cylindrical portion 321 protrudes to a more axially upper side than the disk portion 322, the outer cylindrical portion 323, and the flange portion 324. A through hole 320 passing through the rotor hub 32 in the axial direction is provided in a radial inside of the inner cylindrical portion 321. The shaft 23 passes through the through hole 320. An inner circumferential surface of the inner cylindrical portion 321 and an outer circumferential surface of the shaft 23 are opposed to each other in the radial direction via a slight gap therebetween. The bearing portions 25 are interposed in the gap.

The outer cylindrical portion 323 extends in a cylindrical shape in the axial direction in the radial outside of the stator 22. The disk portion 322 expands in an annular plate shape with the central axis 9 as the center. The disk portion 322 closes at least a part between the inner cylindrical portion 321 and an upper portion of the outer cylindrical portion 323. A plurality (six in the present example embodiment) of screw holes 325 are formed on an upper surface of the disk portion 322. Each of the screw holes 325 is recessed downward. The plurality of screw holes 325 are provided at equal intervals in the circumferential direction around the inner cylindrical portion 321. The flange portion 324 expands radially outside from a lower end portion of the outer cylindrical portion 323. The flange portion 324 may be configured to expand radially outside from at least a part of the rotor hub 32 excluding an upper end portion.

An outer circumferential surface 326 of the outer cylindrical portion 323 is fitted into the circular hole of the mirror unit 12. At least a part of an inner circumferential portion of the mirror unit 12 comes into contact with the outer circumferential surface 326 of the outer cylindrical portion 323. The mirror unit 12 is supported on an outer circumferential portion of the rotor hub 32 while being positioned in the radial direction. The mirror unit 12 is arranged on an axially upper side of the flange portion 324. A lower surface of the mirror unit 12 comes into contact with at least a part of an upper surface of the flange portion 324. Thereby, the mirror unit 12 is supported on the outer circumferential portion of the rotor hub 32 while being positioned in the axial direction. In this way, the mirror unit 12 is held while being positioned with high accuracy in the axial direction and the radial direction by a step portion near a radially inner end portion of the flange portion 324 in the rotor hub 32.

The first magnet 33 is mounted on the rotor hub 32 by being fixed to an inner circumferential surface of the outer cylindrical portion 323 with, for example, an adhesive. An annular permanent magnet is used for the first magnet 33 of the present example embodiment. The first magnet 33 is positioned in the radial outside of the stator 22. An inner circumferential surface of the first magnet 33 is opposite to a radial outside end surface of each of the plurality of teeth of the stator 22 in the radial direction via a slight gap. As described above, the motor 11 used in the mirror rotary device 1 of the present example embodiment has a so-called outer rotor type configuration in which the rotor is positioned in a more radial outside than the stator. The motor 11 may have a so-called inner rotor type configuration in which the rotor is positioned in a more radial inside than the stator.

North poles and south poles are alternately magnetized in the circumferential direction on the inner circumferential surface of the first magnet 33. A plurality of magnets may be used instead of the annular first magnet 33. In that case, the plurality of magnets may be arranged on the inner circumferential surface of the outer cylindrical portion 323 so that a pole face of the north pole and a pole face of the south pole are alternately arranged in the circumferential direction. The first magnet 33 may be indirectly fixed to the rotor hub 32 via a yoke made of a ferromagnetic material such as iron. Thereby, magnetic flux generated from the first magnet 33 is suppressed from escaping outside.

Figure 3:
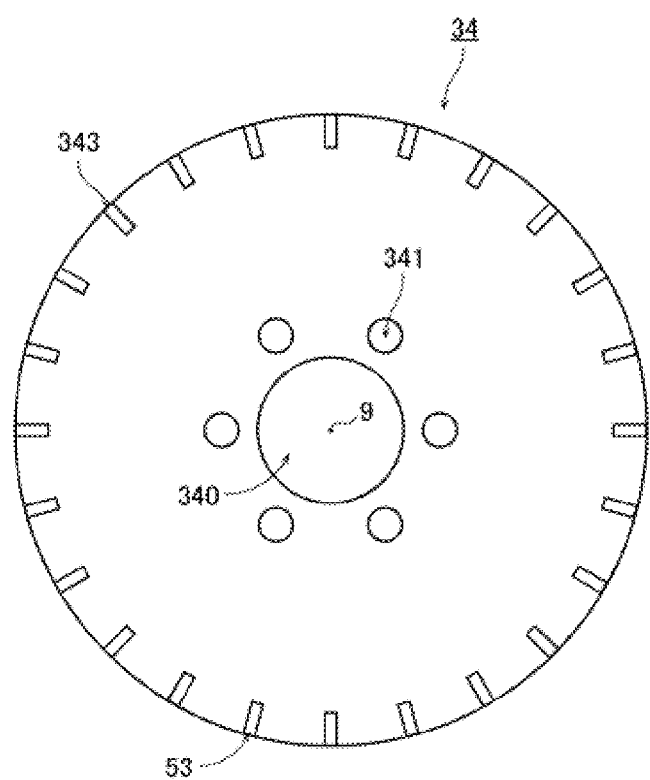
FIG. 3 is a top view of a clamp according to the first example embodiment of the present disclosure.

The clamp 34 expands in an annular plate shape with the central axis 9 as the center on a more radial outside than the inner cylindrical portion 321 and on the more axially upper side than the disk portion 322, the outer cylindrical portion 323, and the flange portion 324. FIG. 3 is a top view of the clamp 34 according to the first example embodiment. As shown in FIG. 3, the clamp 34 has a central through hole 340 and a plurality (six in the present example embodiment) of screw through holes 341. The central through hole 340 and the plurality of screw through holes 341 respectively penetrate the clamp 34 in the axial direction. The shaft 23 and the inner cylindrical portion 321 of the rotor hub 32 penetrate the central through hole 340.

The plurality of screw through holes 341 are provided at equal intervals in the circumferential direction around the central through hole 340. The clamp 34 is fixed to the upper surface of the disk portion 322 by screwing a second fastening member 35 such as a screw passing through each of the plurality of screw through holes 341 into the screw hole 325. The clamp 34 is indirectly fixed to the rotor hub 32 via the second fastening members 35 in a more radial inside than the mirror unit 12. Thereby, the clamp 34 is firmly fixed to the rotor hub 32. The clamp 34 may be indirectly fixed to an upper surface of the outer cylindrical portion 323 via the second fastening members 35. The clamp 34 may be directly fixed to the rotor hub 32 by using an adhesive in the more radial inside than the mirror unit 12. As described above, upper end portions of the disk portion 322 and the outer cylindrical portion 323 are positioned in a more axially lower side than the upper end portion of the inner cylindrical portion 321. According to the present example embodiment, the entire motor 11 is miniaturized in the axial direction by fixing the clamp 34 on the upper end portion of the disk portion 322 or the outer cylindrical portion 323.

The clamp 34 of the present example embodiment has a projection portion 342. The projection portion 342 protrudes to an axially lower side from a part of a lower surface of the clamp 34. The mirror unit 12 is sandwiched between the clamp 34 and the flange portion 324 of the rotor hub 32 in the axial direction. The mirror unit 12 comes into contact with the projection portion 342 and is pressed downward in the axial direction from the clamp 34. A radial position of a contact portion between the mirror unit 12 and the projection portion 342 is positioned more inside than a radial position of an outer circumferential surface of the flange portion 324. Thereby, the mirror unit 12 is more stably supported in the rotation unit 3 including the rotor hub 32 and the clamp 34.

It is desirable that a radial position of an outer circumferential surface of the clamp 34 is the same as a radial position of an outer circumferential surface of the mirror unit 12 or slightly more inside than the radial position of the outer circumferential surface of the mirror unit 12. Thereby, the clamp 34 is suppressed from excessively enlarging in the radial direction and manufacturing costs of the clamp 34 and the housing of the mirror rotary device 1 and the like are reduced.

In the above motor 11, when the drive current is supplied to the coils 42 via the circuit board described above, magnetic flux is generated at the plurality of teeth. Then, circumferential torque is generated between the stationary unit 2 and the rotation unit 3 by an action of the magnetic flux between the teeth and the first magnet 33. As a result, the rotation unit 3 rotates centered the central axis 9 with respect to the stationary unit 2. Further, the mirror unit 12 supported on the outer circumferential portion of the rotor hub 32 rotates centered the central axis 9 together with the rotation unit 3. Thus, the mirror unit 12 irradiates the reflected light 152 to the outside of the mirror rotary device 1 while changing a direction of the reflection surface 120 and reflecting the incident light 151 incident from the main light source 15.

As the bearing portion 25, for example, a hydrodynamic pressure bearing is used. In that case, the stationary unit 2 and the rotation unit 3 oppose to each other via a gap where lubricating oil is present. When the motor 11 is driven, hydrodynamic pressure is induced in the lubricating oil. A bearing having another configuration such as a rolling bearing may alternatively be used as each bearing portion 25.

A configuration of a detection unit 50 that detects rotation of the rotation unit 3 will be described hereinafter.

As shown in FIG. 2 and FIG. 3, a plurality of slits 343 for detecting the rotation of the rotation unit 3 are provided on an upper surface of an outer circumferential portion of the clamp 34 of the present example embodiment. The plurality of slits 343 are arranged in the circumferential direction with the central axis 9 as the center. In the present example embodiment, 24 slits 343 are formed at equal intervals in the circumferential direction. The number of slits 343 is not limited to the above configuration. The plurality of slits 343 may be formed at unequal intervals in the circumferential direction. A plurality of through holes each penetrating a part of the clamp 34 in the axial direction may be provided instead of the plurality of slits 343.

The cover 14 includes an axial opposite portion (first opposite portion) 141 that extends radially outside from the vicinity of the upper end portion of the shaft 23 and is opposite to the upper surface of the clamp 34 in the axial direction. A sub-light source 51 and a detection sensor 52 are provided at one place in the circumferential direction on a lower surface of the axial opposite portion 141. The radial positions of the sub-light source 51 and the detection sensor 52 are equal to the radial positions of the plurality of slits 343, respectively. Incident light 511 proceeding downward in the axial direction toward the plurality of slits 343 is emitted from the sub-light source 51. The detection sensor 52 detects the rotation of the rotation unit 3 by detecting reflected light 512 reflected by the plurality of slits 343. More specifically, while the sub-light source 51 and the detection sensor 52 are fixed to the cover 14 formed on the stationary unit 2, the plurality of slits 343 rotate in the circumferential direction together with the clamp 34. The reflected light 512 reflected by the plurality of slits 343 and received by the detection sensor 52 changes periodically. As a result, the rotation (the number of rotations and a rotation angle) of the rotation unit 3 is detectable by detecting the reflected light 512 chronologically. In the present example embodiment, the detection unit 50 for detecting the rotation of the rotation unit 3 is configured by a pattern 53 to be detected that is the plurality of slits 343 formed on the clamp 34, the sub-light source 51, and the detection sensor 52.

Thereby, the pattern 53 to be detected is formed without necessity of preparing another member different from the clamp 34. That is, the number of parts is reducible by adding a part of an encoder function for detecting the rotation (the number of rotations and the rotation angle) of the rotation unit 3 to the clamp 34 having a role of pressing the mirror unit 12. For this reason, a manufacturing cost of the motor 1 is reduced. Further, since the clamp 34 and the cover 14 to which the sub-light source 51 and the detection sensor 52 are attached are assembled at a relatively later stage in a manufacturing process of the mirror rotary device 1, a positional relationship between them is easily adjusted. As a result, the detection unit 50 is mounted and formed with high accuracy and ease. Furthermore, in the present example embodiment, since the pattern 53 to be detected is provided on the upper surface of the clamp 34, a relatively wide installation range of the pattern 53 to be detected is ensured. Thereby, detection accuracy by the detection sensor 52 is further increased.

The radial position of the outer circumferential surface of the clamp 34 is positioned more outside than the radial position of the outer circumferential surface of the flange portion 324 of the rotor hub 32. Thus, the pattern 53 to be detected is formed at a place away from the contact portion between the projection portion 342 of the clamp 34 and the mirror unit 12 to the radial outside. As a result, even though the clamp 34 is deformed due to the contact between the clamp 34 and the mirror unit 12, the deformation hardly reaches the pattern 53 to be detected. Therefore, the rotation of the rotation unit 3 is detectable with high accuracy.

Figure 4:
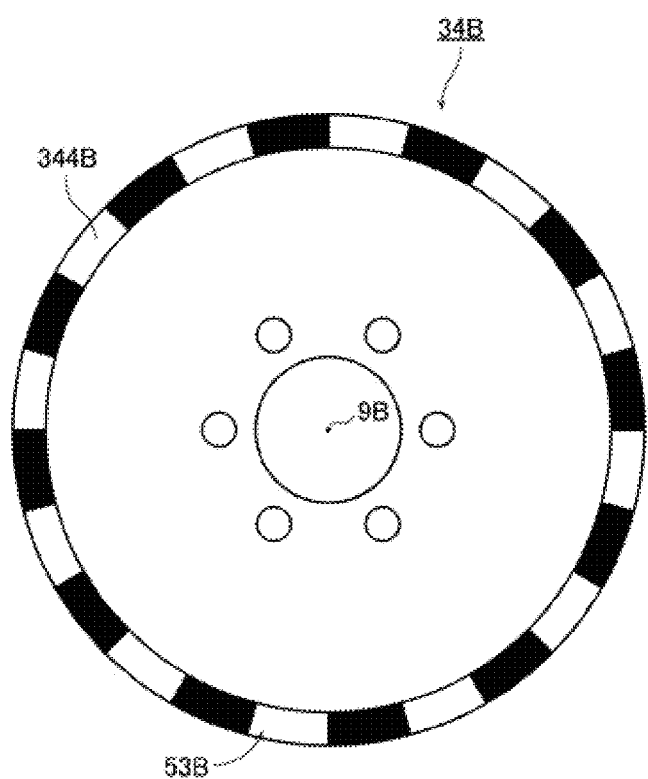
FIG. 4 is a top view of a clamp according to a modified example of an example embodiment of the present disclosure.

As shown in a modified example of FIG. 4, a pattern 53B to be detected may be a tape 344B in which a plurality of colors (black and white in the present modified example) are alternately arranged in the circumferential direction with a central axis 9B as the center. That is, the detection unit 50 for detecting the rotation of the rotation unit 3 may be composed of the tape 344B mounted on an upper surface of an outer circumferential portion of a clamp 34B, the above-described sub-light source 51 that emits the light toward the tape 344B, and the above-described detection sensor 52 that detects the reflected light 512 reflected by the tape 344B. The pattern 53B to be detected is easily mounted on the clamp 34B or a position of the pattern 53B to be detected is easily adjusted by using the tape 344B as the pattern 53B to be detected. As a result, the detection unit 50 is mounted and formed more accurately and easily.

Figure 5:
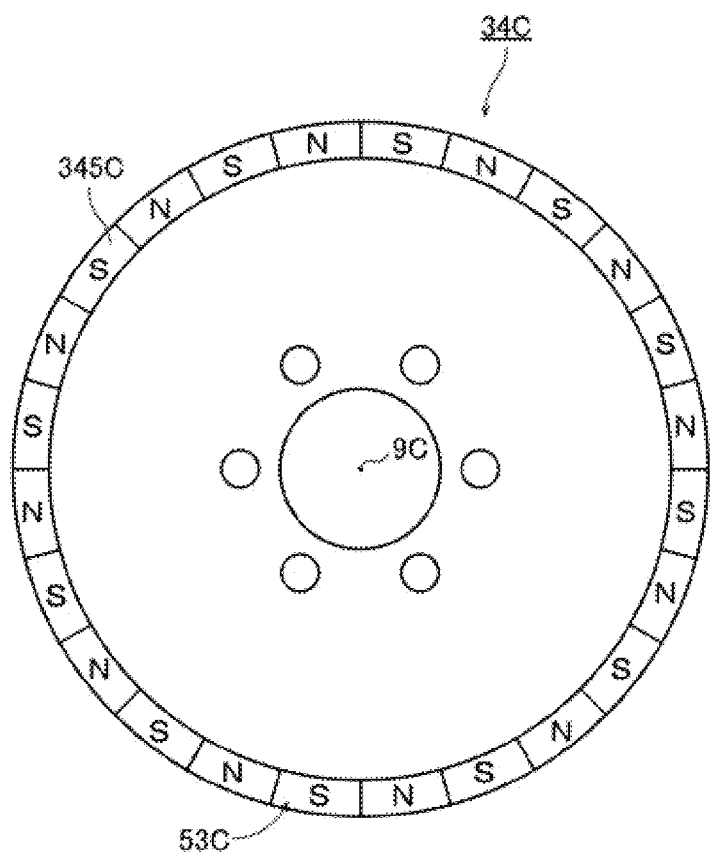
FIG. 5 is a top view of a clamp according to another modified example of an example embodiment of the present disclosure.

Further, as shown in another modified example of FIG. 5, a pattern 53C to be detected may be a second magnet 345C in which a pole face of the north pole and a pole face of the south pole are alternately arranged in the circumferential direction with a central axis 9C as the center. Then, a magnetic detection sensor (not shown) for detecting a magnetic field formed by the pole faces of the second magnet 345C may be provided at one place in the circumferential direction on the lower surface of the axial opposite portion 141 formed in the above-described cover 14 instead of the above-described sub-light source 51 and the detection sensor 52. While the magnetic detection sensor is fixed to the cover 14 formed on the stationary unit 2, the second magnet 345C rotates in the circumferential direction together with a clamp 34C. Thus, the magnetic field detected by the magnetic detection sensor changes periodically. Consequently, the rotation (the number of rotations and the rotation angle) of the rotation unit 3 is detectable by detecting the magnetic field chronologically. In the present modified example, the detection unit 50 for detecting the rotation of the rotation unit 3 is composed of the pattern 53C to be detected that is the second magnet 345C formed on the clamp 34C and the above-described magnetic detection sensor.

While the exemplary example embodiment of the present disclosure has been described above, the present disclosure is not limited to the example embodiment described above.

Figure 6:
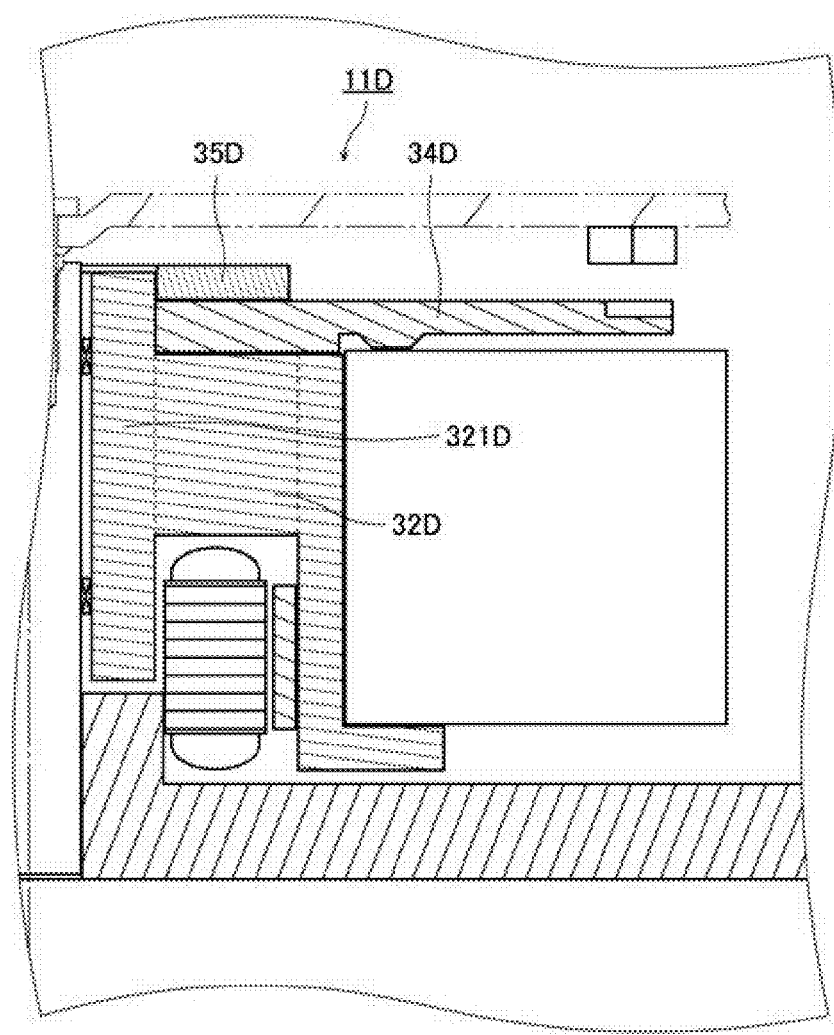
FIG. 6 is a partially vertical cross-sectional view of a motor according to still another modified example of an example embodiment of the present disclosure.

The second fastening member 35 for fixing the clamp 34 to the rotor hub 32 is not limited to the screw. FIG. 6 is a partially vertical cross-sectional view of a motor 11D according to still another modified example. As shown in the modified example of FIG. 6, a second fastening member 35D may be a C-type clip fixed to a rotor hub 32D. In the present modified example, the second fastening member 35D grips an outer circumferential surface near an upper end portion of an inner cylindrical portion 321D of the rotor hub 32D and presses an upper surface of a clamp 34D downward in the axial direction. The clamp 34D is fixed to the rotor hub 32D by being sandwiched between the second fastening member 35D and the rotor hub 32D in the axial direction. With such a configuration, the clamp 34D is easily fixed to the rotor hub 32D.

Figure 7:
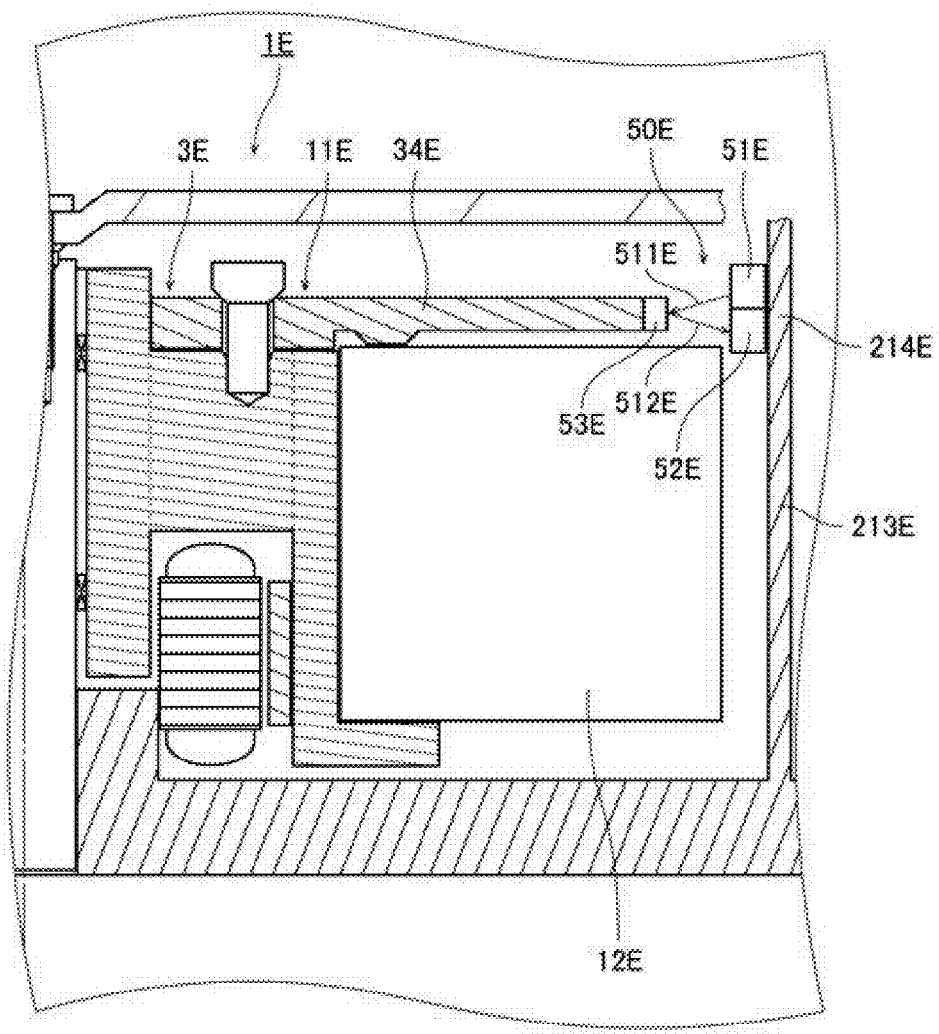
FIG. 7 is a partially vertical cross-sectional view of a mirror rotary device according to still another modified example of an example embodiment of the present disclosure.

FIG. 7 is a partially vertical cross-sectional view of a mirror rotary device 1E according to still another modified example. In the example of FIG. 7, a side wall portion 213E includes a radial opposite portion (second opposite portion) 214E that is opposite to an outer circumferential surface of a clamp 34E in the radial direction. A sub-light source 51E and a detection sensor 52E are provided at one place in the circumferential direction of an inner circumferential surface of the radial opposite portion 214E. In addition, a pattern 53E to be detected including a plurality of slits or the like is arranged in the circumferential direction with the central axis as the center on the outer circumferential surface of the clamp 34E. Axial positions of the sub-light source 51E and the detection sensor 52E are equal to an axial position of the pattern 53E to be detected, respectively. Incident light 511E proceeding inward in the radial direction toward the pattern 53E to be detected is emitted from the sub-light source 51E. The detection sensor 52E detects rotation of a rotation unit 3E of a motor 11E by detecting reflected light 512E reflected by the pattern 53E to be detected. In the present modified example, a detection unit 50E for detecting the rotation of the rotation unit 3E is composed of the pattern 53E to be detected formed on the clamp 34E, the sub-light source 51E, and the detection sensor 52E.

Thereby, like the above-described example embodiment and modified examples, the pattern 53E to be detected is formed without necessity of preparing another member different from the clamp 34E. That is, since the number of parts is reducible by adding a part of an encoder function for detecting the rotation (the number of rotations and the rotation angle) of the rotation unit 3E to the clamp 34E having a role of pressing a mirror unit 12E, a manufacturing cost is reduced. Furthermore, in the present modified example, since the pattern 53E to be detected is provided on the outer circumferential surface of the clamp 34E, the entire motor 11E including the clamp 34E is miniaturized in the axial direction. The pattern 53E to be detected may be provided near a center portion of an upper surface or a circumferential edge portion of a lower surface or the like of the clamp 34E. The pattern to be detected only needs to be formed on a surface of the clamp.

Figure 8:
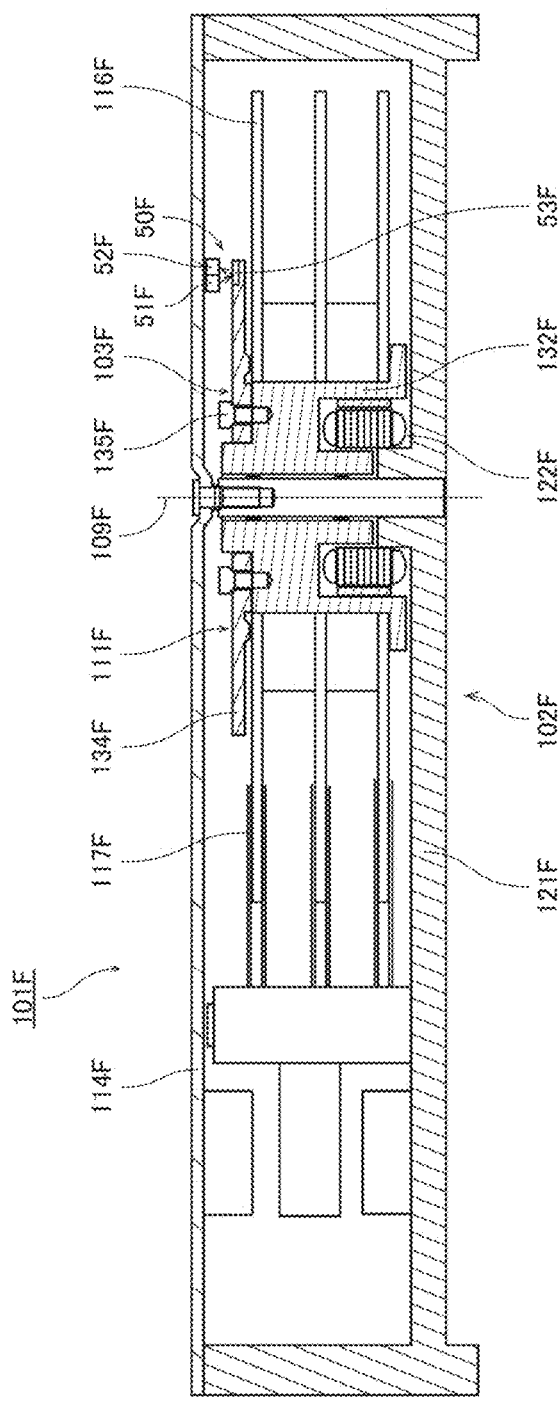
FIG. 8 is a vertical cross-sectional view of a disk drive device according to still another modified example of an example embodiment of the present disclosure.

The motor and the detection unit that detects the rotation of the rotation unit disclosed in the above-described example embodiment and modified examples are used for the mirror rotary device that rotates the mirror unit having a plurality of mirror surfaces on the outer circumferential surface. The motor and the detection unit of the present disclosure may be used for any device including the mirror rotary device that supports the annular member annularly extending in the circumferential direction on the outer circumferential portion of the rotor hub and rotates the annular member. FIG. 8 is a vertical cross-sectional view of a disk drive device 101F having an annular member according to still another modified example. The disk drive device 101F is a device that reads and writes information from and to magnetic disks 116F each of which is an annular member having a circular hole in a center while rotating the magnetic disks 116F. As shown in FIG. 8, the disk drive device 101F includes a motor 111F, one or more (three in the present modified example) magnetic disks 116F, access units 117F, and a cover 114F that constitutes a part of the housing.

The motor 111F rotates the magnetic disks 116F with a central axis 109F as the center while supporting the magnetic disks 116F. A stationary unit 102F of the motor 111F has a base portion 121F that supports a stator 122F directly or indirectly. A rotation unit 103F of the motor 111F, the magnetic disks 116F, and the access units 117F are accommodated in the housing constituted with the base portion 121F and the cover 114F. Each access unit 117F moves a head along a recording surface of the magnetic disk 116F, and performs at least one of reading and writing of information with respect to the magnetic disk 116F supported by the rotation unit 103F of the motor 111F.

Like the above-described example embodiment and modified examples, a clamp 134F that presses down the magnetic disk 116F is fixed to an upper surface of a rotor hub 132F by screwing with second fastening members 135F such as screws. A detection unit 50F that detects rotation of the rotation unit 103F is composed of a pattern 53F to be detected formed on an upper surface of an outer circumferential portion or an outer circumferential surface of the clamp 134F, a sub-light source 51F and a detection sensor 52F fixed to the housing.

The present disclosure is usable for, for example, a motor, a mirror rotary device, and a disk drive device.

Features of the above-described example embodiments and the modifications thereof may be combined appropriately as long as no conflict arises.

While example embodiments of the present disclosure have been described above, it is to be understood that variations and modifications will be apparent to those skilled in the art without departing from the scope and spirit of the present disclosure. The scope of the present disclosure, therefore, is to be determined solely by the following claims.

What is claimed is:

1. A motor, comprising:
   a stationary unit including a stator; and
   a rotation unit rotatably supported with respect to the stationary unit with a central axis vertically extending as a center via a bearing portion; wherein
   the rotation unit includes a rotor hub that is at least partially positioned radially outside of the stator, the rotor hub is mounted with a first magnet being opposite to the stator, and expands in an annular shape around the central axis;
   the rotation unit further includes an annular body supported by an outer circumferential portion of the rotor hub, and a clamp that is directly or indirectly fixed to the rotor hub farther radially inside than the annular body and that presses the annular body to an axially lower side;
   the rotor hub includes a flange that expands radially outside from at least a portion excluding an upper end portion;
   the clamp is provided with a pattern to be detected to detect rotation of the rotation unit, and the pattern to be detected is positioned in a circumferential direction with the central axis as a center on a surface of the clamp; and
   the annular body is sandwiched between the flange and the clamp in an axial direction.

2. The motor according to claim 1, wherein the pattern to be detected is provided on an outer circumferential portion of the clamp.

3. The motor according to claim 1, wherein
   the rotor hub includes a cylindrical portion axially extending in a cylindrical shape radially outside of the stator and a disk portion that expands in a disk shape with the central axis as a center and that closes at least a portion of an upper portion of the cylindrical portion; and
   the clamp is indirectly fixed to an upper surface of the cylindrical portion or an upper surface of the disk portion via a fastener.

4. The motor according to claim 3, wherein
   the fastener includes a screw;

the rotor hub includes a screw hole on an upper surface of the rotor hub; and the clamp includes a through hole that penetrates in the axial direction and is fixed to the rotor hub by screwing the fastener into the screw hole via the through hole.

5. The motor according to claim 3, wherein
the fastener includes a clip that is fixed to the rotor hub; and
the clamp is fixed to the rotor hub by being sandwiched between the fastener and the rotor hub.

6. The motor according to claim 3, wherein
the annular body includes an inner circumferential surface that is in contact with an outer circumferential surface of the cylindrical portion; and
the annular body includes a lower surface that is in contact with an upper surface of the flange.

7. The motor according to claim 1, wherein
the clamp includes a projection portion that protrudes downward in the axial direction and that comes into contact with the annular body; and
a radial position of a contact portion between the projection portion and the annular body is positioned farther inside than a radial position of an outer circumferential surface of the flange.

8. The motor according to claim 1, wherein a radial position of an outer circumferential surface of the clamp is the same as a radial position of an outer circumferential surface of the annular body or farther inside than the radial position of the outer circumferential surface of the annular body.

9. The motor according to claim 1, wherein a radial position of an outer circumferential surface of the clamp is positioned farther outside than a radial position of an outer circumferential surface of the flange.

10. The motor according to claim 1, wherein
the pattern to be detected includes a plurality of slits positioned at intervals from each other in the circumferential direction with the central axis as the center;
the motor further includes a detector that detects rotation of the rotation unit; and
the detection unit includes the plurality of slits, a sub-light source that emits light toward the plurality of slits, and a detection sensor that detects the rotation of the rotation unit by detecting light reflected by the slits.

11. The motor according to claim 10, wherein
the stationary unit further includes a shaft extending along the central axis and a first opposite portion that extends radially outside from an upper portion of the shaft, and the first opposite portion is opposite to an upper surface of the clamp in the axial direction;
the detector is provided on a lower surface of the first opposite portion; and
the pattern to be detected is provided on the upper surface of the clamp.

12. The motor according to claim 10, wherein
the stationary unit further includes a shaft extending along the central axis and a second opposite portion that extends axially upper side from a base portion to which a lower portion of the shaft is fixed, and the second opposite portion is opposite to an outer circumferential surface of the clamp in the radial direction;
the detector is provided on an inner circumferential surface of the second opposite portion; and
the pattern to be detected is provided on the outer circumferential surface of the clamp.

13. The motor according to claim 1, wherein
the pattern to be detected includes a tape in which a plurality of colors are alternately arranged in the circumferential direction with the central axis as a center;
the motor further includes a detector that detects rotation of the rotation unit; and
the detector includes the tape, a sub-light source that emits light toward the tape, and a detection sensor that detects the rotation of the rotation unit by detecting light reflected by the tape.

14. The motor according to claim 1, wherein
the pattern to be detected includes a second magnet in which a pole face of a north pole and a pole face of a south pole are alternately arranged in the circumferential direction with the central axis as the center;
the motor further includes a detector that detects rotation of the rotation unit; and
the detection unit includes the second magnet and a detection sensor that detects the rotation of the rotation unit by detecting a magnetic field generated by the pole faces of the second magnet.

15. A mirror rotary device, comprising:
the motor according to claim 1; and
a main light source; wherein
the annular body includes a mirror including a plurality of reflection surfaces on an outer circumferential surface, and each of the reflection surfaces faces radially outside; and
a direction of incident light from the main light source incident on the reflection surface is changed by the reflection surface and reflected to an outside.

16. A disk drive device, comprising:
the motor according to claim 1;
an access unit that performs at least one of reading and writing of information with respect to a disk that is the annular body supported by the rotation unit of the motor; and
a cover; wherein
the stationary unit includes a base portion that directly or indirectly supports the stator; and
the rotation unit and the access unit are accommodated in a housing including the base portion and the cover.

* * * * *